W. H. FRIEDRICH.
PACKING ROTARY ENGINES.
APPLICATION FILED JUNE 18, 1917.
1,243,830.
Patented Oct. 23, 1917.
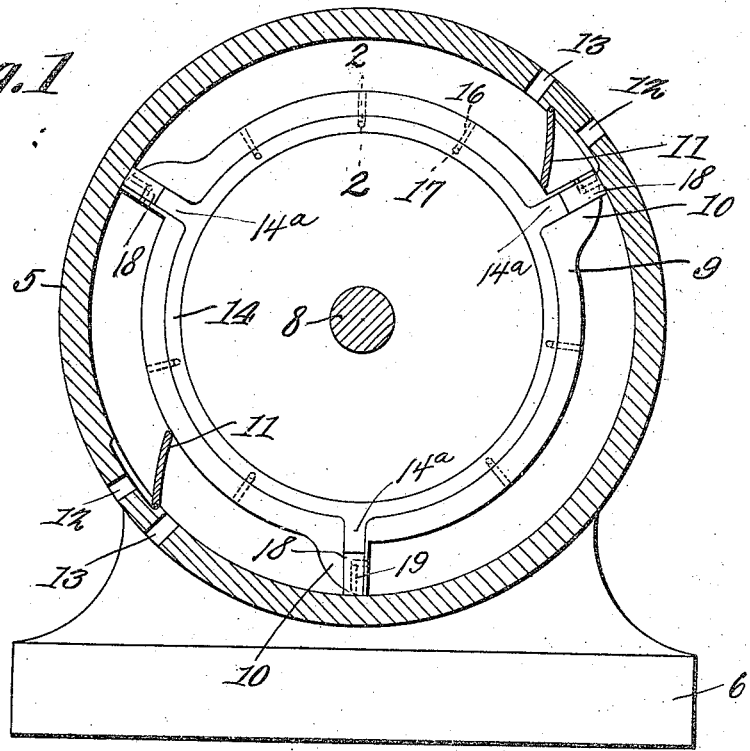
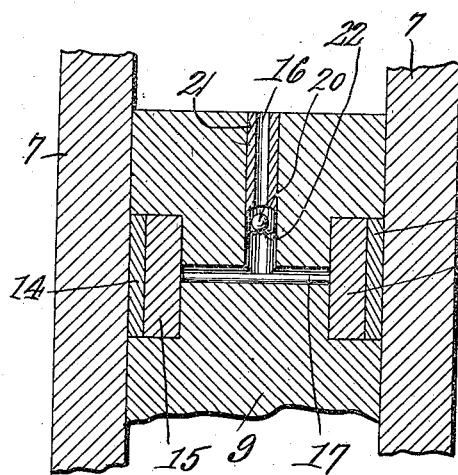
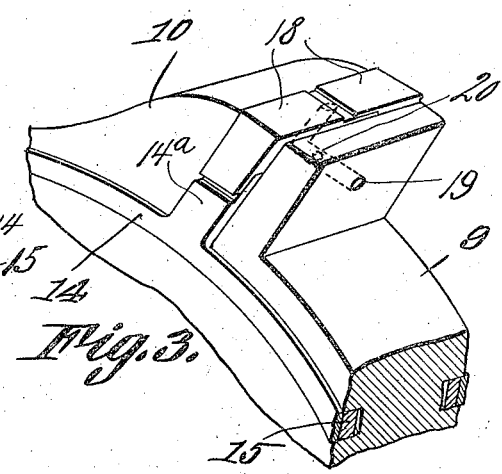
Inventor
William H. Friedrich
By
Attorneys

UNITED STATES PATENT OFFICE.

WILLIAM H. FRIEDRICH, OF DYER, INDIANA.

PACKING ROTARY ENGINES.

1,243,830.

Specification of Letters Patent. Patented Oct. 23, 1917.

Application filed June 18, 1917. Serial No. 175,420.

*To all whom it may concern:*

Be it known that I, WILLIAM H. FRIEDRICH, a citizen of the United States, residing at Dyer, in the county of Lake and State of Indiana, have invented new and useful Improvements in Packing Rotary Engines, of which the following is a specification.

This invention has for its object to provide in a rotary engine a novel and improved packing for the piston, to prevent leakage of the steam or other motive fluid, and to this end the invention consists in a combination and arrangement of parts to be hereinafter described and claimed.

In order that the invention may be better understood, reference is had to the accompanying drawings forming a part of this specification, and in said drawings, Figure 1 is a transverse section through the cylinder of the engine showing the rotor and other parts associated therewith;

Fig. 2 is an enlarged section on the line 2—2 of Fig. 1, and

Fig. 3 is a detail in perspective.

Referring specifically to the drawings 5 denotes the cylinder of the engine, the same being mounted on a suitable base 6, and closed at its end by heads 7. Through the center of the cylinder passes a shaft 8 carrying a rotor 9 having piston wings 10 projecting radially from its periphery and in sliding contact at their outer ends with the cylinder wall, and at their side edges with the cylinder heads. Into the fluid pressure space of the cylinder extend swinging abutments 11 which are forced back by the piston wings to allow the latter to pass. The cylinder has two inlet ports 12 and two exhaust ports 13. The engine is a well-known type of rotary engine, and as its operation is well understood, a further description is deemed unnecessary.

In order to prevent leakage of the steam or other motive fluid, the following packing is provided for the rotor and its piston wings.

In each end of the rotor 9 is a circular groove in which seat two packing rings 14 and 15, respectively. The outer ring is a fiber ring, and the inner or backing ring is a metallic ring. In the periphery of the rotor are ducts 16 extending inward in the direction of the center thereof as far as the grooves in which the packing rings seat, and having at their inner ends oppositely extending branches 17 which lead to and open into the grooves back of the inner rings 15. The steam or other motive fluid enters the ducts 16 and passes along the branches 17 to the rings 15 against which latter the pressure is expended to force said rings and the rings 14 outward, the ring 14 being thus held pressed against the inner face of the heads 7 to produce a fluid tight joint between the ends of the rotor and the cylinder heads 6.

At the piston wings 1, the packing rings 14 have offsets 14ª respectively seating in grooves in the side edges of the piston wings and lapped by angle plates 18, which latter also extend across the outer edge of the piston wings and are here lapped. It will therefore be seen that a fluid tight joint is made between the side edges of the wings and the inner faces of the cylinder heads 7, and also between the outer edges of the wings and the wall of the cylinder 5. By the lap joint between the offset 14ª and the angle plates 18, the latter are forced outward with the rings 14 by the fluid pressure expended against the rings 15, and as the two plates are lap jointed at the outer edge of the piston wings they are free to move outward to follow the rings 14. The lap joint between the plates 18 and the offsets 14ª also leaves the former free to be pressed outward into sealing contact with the inner periphery of the cylinder 5, this action being also produced by the fluid pressure, each piston wing 10 having a duct 19 extending from its rear face and terminating back of the plates 18, and said plates therefore having a lateral movement as well as a radial movement.

In each duct 16 and 19 is a ball check valve 20 having for its seat the inner end of a bushing 21 mounted in the duct. A screen or similar barrier 22 extends across the duct near the valve seat to prevent the valve from dropping too far away from the same. By providing the ducts with check valves, the fluid pressure is prevented from escaping during the exhaust period, and the packing rings are therefore kept pressed outward during the entire time the engine is running, and they are prevented from being unbalanced which would tend to produce leakage.

I claim:

1. In a rotary engine, a cylinder, a rotor in the cylinder and having piston wings extending from its periphery, the ends of the rotor having circular grooves, and the side edges and the outer ends of the piston wings being also grooved, packing rings seating in the circular grooves and having offsets seating in the side grooves of the wings, and overlapping packing plates seating in the end grooves of the wings and having portions seating in the side grooves thereof and overlapping the offsets, the rotor having fluid pressure supply ducts terminating behind the packing rings and the packing plates.

2. In a rotary engine, a cylinder, a rotor in the cylinder and having piston wings extending from its periphery, the ends of the rotor having circular grooves, and the side edges and the outer ends of the piston wings being also grooved, packing rings seating in the circular grooves and having offsets seating in the side grooves of the wings, overlapping packing plates seating in the end grooves of the wings and having portions seating in the side grooves thereof and overlapping the offsets, the rotor having fluid pressure supply ducts terminating behind the packing rings and the packing plates, and check valves in said ducts.

In testimony whereof I affix my signature

WILLIAM H. FRIEDRICH.

Copies of this patent may be obtained for five cents each, by addressing the "Commissioner of Patents, Washington, D. C."